United States Patent Office 2,711,949
Patented June 28, 1955

2,711,949

METHOD AND COMPOSITION FOR THE CONTROL OF PLANT GROWTH

Keith C. Barrons, Midland, Mich., assignor to The Dow Chemical Company, Midland, Mich., a corporation of Delaware No Drawing. Application May 1, 1952,
Serial No. 285,535

12 Claims. (Cl. 71—2.7)

This invention is concerned with contact herbicides and plant maturation agents and is particularly directed to a method and composition for the control of plant growth.

In the agricultural field there has been in recent years an increasing demand for contact herbicides, i. e. toxic agents which kill the portion of the plant contacted therewith. For example, certain distillates derived from petroleum have been found useful in killing young seedling weeds in carrot fields, the carrots being relatively resistant to this type of compound. Various nitro- and halo-phenols and their derivatives have also found widespread application. However, objectionable characteristics have been encountered in the use of the presently known herbicides. Thus, with the hydrocarbon oils from petroleum, considerable variation is encountered depending upon such factors as temperature, soil moisture and the stage of growth of the vegetation to be treated, while with the phenolic materials residues detrimental to crop plants are sometimes encountered. Persistent residues are particularly undesirable in pre-emergent applications of herbicides where the toxicant is applied to the foliage of small weeds which emerge after the planting of a crop but prior to the emergence thereof.

In the field of plant maturation agents, used to prepare crops such as cotton, beans, flax, rice and the like for more efficient harvesting, no completely satisfactory agent has yet been encountered. Desirable plant maturation agents would be effective, for example, in accomplishing the defoliation of cotton, beans and the like and in decreasing the moisture content of rice, flax and milo prior to harvesting. The wide variety of climatic conditions at harvesting time in various parts of the country where such crops are grown make necessary a maturation agent which will penetrate the plant foliage readily, be active under conditions such as low soil moisture or light morning dews and, at the same time, be non-injurious to that portion of the plant which is to be harvested.

It is an object of the present invention to provide an improved method for controlling the growth of undesired vegetation. Another object is to provide an improved method for controlling weeds without injury to a subsequently emerging crop. A further object is to provide a method for the maturation of crop plants prior to harvesting and of nursery stock prior to storage. Yet another object is to provide novel compositions which possess improved contact herbicidal and plant maturant activity. Other objects will become apparent from the following specification and claims.

According to the present invention, glycol bis(monobromoacetates) having the formula

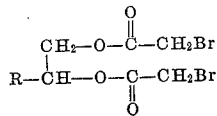

in which R represents hydrogen or a methyl radical, have been found to have superior properties as contact herbicides and plant maturants. The glycol bis(bromoacetate) products or compositions containing a herbicidal concentration thereof rapidly penetrate and kill the tissues of young succulent plant growth contacted therewith. On the other hand, by proper control of the dosage of the phytotoxic agent, maturation of crop plants may be promoted without injury to the portion of the plant to be harvested. It is among the advantages of the present invention that the glycol bis(bromoacetates) not only penetrate the plant tissues readily but also affect tissue for some distance about the site of application. Another advantage is found in the relatively low volatility of the toxic agent whereby the agents remain in or on the plant foliage for a time sufficient to accomplish their phytotoxic and/or maturant effects. It is a further advantage that the activity of the ester compound is dissipated rapidly in soil so that a crop emerging any reasonable period subsequent to the treatment is free of injurious effects.

In carrying out the invention, the glycol bis(bromoacetate) compounds may be admixed with finely divided solid diluents such as pyrophyllite, diatomaceous earth, volcanic ash, wood flour and the like to prepare dust compositions. Similarly, the active phytotoxic compounds may be dispersed on fertilizers or other soil conditioning agents. The mixtures of the active bromoacetate compounds with solid diluents may be prepared by mechanically mixing together the undiluted active ingredient with the desired diluent. Alternatively, the diester compound may be dissolved in a suitable volatile organic solvent and dispersed on the diluent, the solvent being evaporated and recovered during the mixing process.

Where compositions containing inert solid diluents are to be applied as dusts, the incorporation therein of wetting, sticking and emulsifying agents is optional. However, where it is desired to apply the active ingredient in aqueous dispersion, a preferred embodiment of the invention consists of a dust mixture modified with suitable surface active dispersing agents and employed as a concentrate adapted to be dispersed in water.

Wetting, emulsifying and surface active dispersing agents compatible in the compositions of the present invention include alkali and alkaline earth metal caseinates, blood albumen, alkali metal salts of long chain aliphatic sulfates, alkyl aryl sulfates, partially neutralized sulfuric acid derivatives of petroleum oils and naturally occurring glycerides, sulfonated derivatives of phenols and esters, condensation products of alkylene oxides with phenols, alcohols and organic acids, and clays such as fuller's earth, attapulgite and the like. In utilizing the clay minerals as dispersing agents, it is frequently desirable to use an excess of such agent over and above the minimum necessary for dispersing the composition, the excess clay mineral then acting as an inert diluent.

In an alternative method of carrying out the invention, the glycol bis(bromoacetate) compound is formulated with a surface active dispersing agent with or without additional organic carrier, as desired, to prepare an emulsifiable liquid concentrate which is adapted to be further diluted with oil or dispersed in water for the preparation of dilute spray mixtures. In this embodiment of the invention, the preferred surface active dispersing agents are oil soluble and particularly include the non-ionic emulsifiers such as the condensation products of alkylene oxides with phenols and organic acids, polyoxyethylene derivatives of sorbitan esters, complex ether-alcohols and the like. However, oil-soluble ionic emulsifying agents such as the mahogany soaps from the sulfonation of petroleum may also be used. Suitable organic carriers include liquid aromatic hydrocarbons, solvents derived from the distillation of petroleum and coal, liquid halohydrocarbons and the like.

In the choice of diluents and surface active dispersing agents to be employed in any of the compositions as set forth above, it is preferred to avoid the use of alkaline materials which may catalyze the breakdown of the active bis(bromoacetate) compounds in storage.

The proportions of materials employed in the compositions may vary considerably depending on the end use for which the composition is designed. Dust compositions for direct application to vegetation may contain from 0.5 percent to 10 percent or more of the active ingredient by weight. When the composition is designed as a concentrate for the preparation of sprays or more dilute dusts, the content of active ingredients may vary from 10 percent to as high as 50 percent by weight, the balance of the composition being one of the diluents, carriers and/or surface active dispersing agents previously mentioned. Liquid dispersions of the toxicant in water or an organic solvent may vary in a similar fashion from a very low percentage of the active ingredient, e. g. 0.2 to 15 percent by weight where the dispersion is to be applied directly to the undesired vegetation, to a relatively high percentage, e. g. 10 to 50 percent by weight or higher, where the dispersion is to be employed as a concentrate.

The amount of glycol bis(bromoacetate) compound to be applied varies depending on such factors as ambient temperatures, soil moisture, the species to be controlled, the stage of growth of the vegetation and whether contact kill or plant maturation is desired. In particular for the selective control of young broadleafed weeds in the presence of grasses it is necessary to apply a controlled dosage sufficient to kill the broadleafed weeds without permanently injuring the grasses. Similarly, for plant maturation the dosage must be regulated so as to accomplish the defoliation or dehydration effect desired without appreciable injury to the portion of the plant to be harvested. In general, from about 2.5 to 15 pounds or more of the glycol bis(bromoacetate) compound is applied per acre where contact herbicidal effects are desired, although selective control of small broadleaf weed seedlings may be achieved with as little as 2 pounds of the active ingredient per acre. When utilizing the present compounds for plant maturation, good results are obtained when employing from 2.5 to 5 pounds of the glycol bis(bromoacetate) compound per acre for the defoliation of cotton and about 4 pounds per acre for the maturation of rice.

The quantity of spray applied is not critical provided only that the above mentioned quantity of active ingredient is applied in sufficient of the finished spray composition adequately to cover the vegetation to be controlled. In the treatment of fields to control small seedling weeds prior to the emergence of a previously planted crop, good coverage has been obtained when using 10 to 20 gallons of finished spray composition per acre although higher volumes may be used depending on the type of spraying equipment available. Where larger, succulent vegetation is to be controlled, it is frequently desirable to employ larger amounts, i. e. 50 to 100 gallons per acre, to assure complete coverage of the vegetation. For the defoliation of cotton, good results have been obtained when employing from 7 to 10 gallons of spray mixture per acre applied by aeroplane and 15 to 20 gallons applied by ground equipment. For the maturation of rice, it is preferred to apply 8 to 10 gallons per acre by aeroplane. In the direct application of dust compositions from 50 to 200 pounds or more of dilute dust is applied per acre, the only critical requirement being that the proper quantity of the active bis(bromoacetate) compound as set forth above be applied in sufficient of the dilute dust to achieve adequate coverage of the vegetation to be controlled. In the application of the sprays and dusts as described above, conventional sprayers and dusters serve for the respective applications.

The following examples illustrate the invention but are not to be construed as limiting the same.

*Example 1*

The following composition was prepared by mixing the ingredients at room temperature and stirring until homogeneous.

| Composition: | Parts by weight |
|---|---|
| Ethylene glycol bis(bromoacetate) | 25.06 |
| Triton X–155 | 4.86 |
| Xylene | 70.08 |

Triton X–155 is an oil-soluble emulsifying agent identified as a dimeric alkylated aryl polyether alcohol.

The above composition was dispersed in water at the rate of 1.25 gallons of composition per 20 gallons of finished spray to prepare a spray emulsion containing 2.7 pounds of the bis(bromoacetate) compound per 20 gallons. The spray emulsion was applied with a boom-type sprayer at the rate of 20 gallons per acre on a fitted field which was infested with tiny weeds. Substantially 100 percent kill of the tiny weeds was observed.

*Example 2*

The composition of Example 1 was dispersed in water at the rate of 2.50 gallons of composition per 20 gallons of finished spray to prepare a spray emulsion containing 5.38 pounds of the bis(bromoacetate) compound per 20 gallons. This spray emulsion was applied at the rate of 20 gallons per acre to a cultivated field area infested with pigweed, lamb's-quarters and purslane, the weeds being about 1 to 3 inches tall. Substantially 100 percent kill of all weed species was observed.

*Example 3*

The composition of Example 1 was dispersed in water at the rate of 1 and 1.5 gallons of composition per 20 gallons of finished spray to prepare spray emulsions containing 2.15 and 3.2 pounds of the bis(bromoacetate) compound per 20 gallons, respectively. These spray emulsions were atomized onto areas of soil in which pigweed, purslane, lamb's-quarters and grass were growing. At the 2.15 pound per acre dosage, pigweed, purslane, and lamb's-quarters showed 100 percent kill. The grass was severely burned but not killed by the latter dosage. At the 3.2 pounds per acre dosage all the plant species were killed.

*Example 4*

A field plot was fitted and planted to carrots and beets. Several days later, young seedling weeds were observed in the planted area but the crop plants had not yet emerged. The composition of Example 1 was dispersed in water and sprayed on the planted area so as to apply the glycol bis(bromoacetate) compound at the rate of 2.7 pounds per acre. Observations 15 days later showed good commercial control of the weed species with only minimal injury to the carrots and beets which emerged to give a good stand after the treatment.

*Example 5*

The following composition was prepared by mixing the ingredients at room temperature and stirring until homogeneous.

| Composition: | Parts by weight |
|---|---|
| Propylene glycol bis(bromoaceate) | 27.4 |
| Triton X–155 | 5.0 |
| Xylene | 67.6 |

This composition was dispersed in water to prepare spray emulsions containing 0.57 and 0.29 percent by weight of the propylene glycol bis(bromoacetate) compound. These emulsions were applied so as to wet the foliage of young corn and bean plants (representative of narrow-leaf and broadleaf species, respectively). On observation one week after application, it was found that all foliage contacted by the herbicidal emulsions was dead.

*Example 6*

The following composition was prepared by the method of Example 5.

Composition:                              Parts by weight
    Ethylene glycol bis(bromoacetate) _____ 50
    Emcol H-47 _____ 10
    Penola 100 _____ 40

Emcol H-47 is a surface active dispersing agent identified as a fatty acid polyhydric alcohol condensation product.
Penola 100 is an aromatic petroleum derivative boiling at 306°–340° F.

The above composition is dispersed in water to prepare an aqueous spray emulsion containing 25 pounds of the bis(bromoacetate) compound per 100 gallons of spray. This aqueous spray composition is applied by aeroplane at a dosage of 10 gallons per acre to a stand of cotton at harvest time. The cotton thereafter defoliates substantially with resultant improved conditions for mechanical harvesting.

*Example 7*

The following ingredients are mechanically mixed and hammermilled through a 1/32 inch screen:

Composition:                              Parts by weight
    Propylene glycol bis(bromoaceate) _____ 40
    Diatomaceous earth _____ 25
    Fuller's earth _____ 33
    Nacconal NR (sodium alkylaryl sulfonate) ____ 2

The above concentrate composition is suitable for further dilution with finely divided inert solids to produce dilute dusts.

The concentrate composition is dispersed in water in a spray tank equipped with agitation, the composition being employed at the rate of 30 pounds per 100 gallons of spray. One gallon of diesel oil is dispersed per 100 gallons of spray mixture. The resultant spray suspension is applied at a dosage of 100 gallons per acre to a field infested with young broadleafed weeds. Excellent herbicidal results are obtained.

The glycol bis(monobromoacetates) of the invention are prepared by reacting one molecular proportion of ethylene glycol or propylene glycol with at least 2 molecular proportions of monobromoacetic acid in the presence of an esterification catalyst such as toluene sulfonic acid. In a representative procedure, the reactants and catalyst, as set forth above, are mixed together in an inert solvent such as toluene or ethylene dichloride and heated to the boiling point of the solvent. The solvent together with water of reaction is distilled off, recovered and separated, the solvent being recycled. When approximately 2 molecular proportions of water have been recovered for each molecular proportion of glycol starting material, heating is discontinued and the glycol bis(bromoacetate) compound is separated by conventional methods such as washing with water and distillation under reduced pressure. The glycol bis(bromoacetate) compounds are liquids or low melting solids, soluble in many organic solvents and relatively insoluble in water. They are characterized by the following properties:

Compound:                                 Boiling point
    Ethylene glycol bis(bromoacetate)
        135°–136° C. at 1.5 mm.
    Propylene glycol bis(bromoacetate)
        133°–136° C. at 1 mm.

A copending application, Serial No. 285,533, filed concurrently herewith, is directed to propylene glycol bis(bromoacetate) as a new chemical compound.

I claim:

1. A method for the control of plant growth which comprises applying to the plant foliage a phytotoxic amount of a glycol bis(monobromoacetate) of the formula

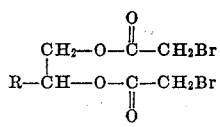

wherein R represents a member of the group consisting of hydrogen and a methyl radical.

2. A method for the control of plant growth which comprises the step of applying to the above-ground portion of the plants a glycol bis(monobromoacetate) of the formula

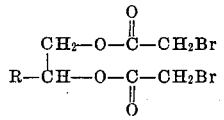

wherein R represents a member of the group consisting of hydrogen and a methyl radical, said compound being applied at a dosage of at least 3 pounds per acre.

3. A method for the maturation of crop plants which comprises applying to crop plants in an advanced stage of growth a glycol bis(monobromoacetate) of the formula

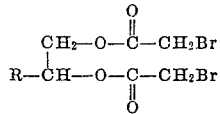

wherein R represents a member of the group consisting of hydrogen and a methyl radical, said compound being employed at a dosage sufficient to cause maturation without causing appreciable injury to the portion of the plant to be subsequently harvested.

4. A method for the maturation of crop plants which comprises applying to crop plants in an advanced stage of growth a glycol bis(monobromoacetate) of the formula

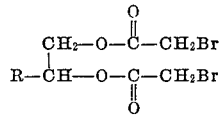

wherein R represents a member of the group consisting of hydrogen and a methyl radical, said compound being applied at a dosage of from about 3 to 7 pounds per acre.

5. A method for the control of plant growth which comprises applying to the above-ground portion of the plants a phytotoxic amount of propylene glycol bis(monobromoacetate).

6. A method for the control of plant growth which comprises applying to the above ground portion of the plants a phytotoxic amount of ethylene glycol bis(monobromoacetate).

7. A composition for the control of plant growth which comprises a surface active dispersing agent and in intimate mixture therewith a glycol bis(monobromoacetate) of the formula

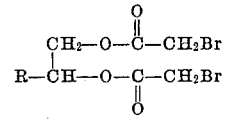

wherein R represents a member of the group consisting of hydrogen and a methyl radical.

8. A composition according to claim 7 wherein the glycol bis(monobromoacetate) is propylene glycol bis(monobromoacetate).

9. A composition according to claim 7 wherein the glycol bis(monobromoacetate) is ethylene glycol bis(monobromoacetate).

10. An aqueous spray composition which comprises water and dispersed therein a surface-active dispersing agent and a phytotoxic concentration of a glycol bis-(monobromoacetate) of the formula

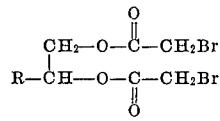

wherein R is selected from the group consisting of hydrogen and a methyl radical.

11. An aqueous spray composition which comprises water and dispersed therein a surface-active dispersing agent and a glycol bis(monobromoacetate) of the formula

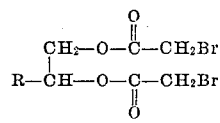

wherein R is selected from the group consisting of hydrogen and a methyl radical, the glycol bis(monobromoacetate) being present in a concentration of at least 2.5 pounds per 100 gallons of aqueous spray.

12. A method for the control of undesired plants growing in soil seeded to a desired crop which comprises applying to the above ground portions of the undesired plants prior to the emergence of the desired crop plants a glycol bis(monobromoacetate) of the formula

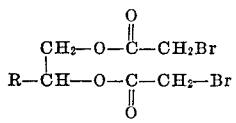

wherein R represents a member of the group consisting of hydrogen and a methyl radical, said compound being employed in an amount sufficient to accomplish the control of said undesired plants without appreciable damage to the desired crop.

References Cited in the file of this patent

UNITED STATES PATENTS

| | | |
|---|---|---|
| 2,282,732 | Lean | May 12, 1942 |
| 2,390,941 | Jones | Dec. 11, 1945 |
| 2,649,363 | Swezey | Aug. 18, 1953 |

OTHER REFERENCES

U. S. Dept. Agriculture, Technical Bulletin No. 162 (March 1929), pages 47 and 48.